United States Patent
Liang

(10) Patent No.: US 8,390,602 B2
(45) Date of Patent: *Mar. 5, 2013

(54) STYLUS RETAINING MECHANISM FOR PORTABLE ELECTRONIC DEVICE

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 319 days.

This patent is subject to a terminal disclaimer.

(21) Appl. No.: 12/869,888

(22) Filed: Aug. 27, 2010

(65) Prior Publication Data

US 2011/0292002 A1 Dec. 1, 2011

(30) Foreign Application Priority Data

May 28, 2010 (CN) .......................... 2010 1 0186085

(51) Int. Cl.
G06F 3/033 (2006.01)
G06F 3/041 (2006.01)
G06K 11/06 (2006.01)
G08C 21/00 (2006.01)

(52) U.S. Cl. ................. 345/179; 178/19.01; 361/679.01

(58) Field of Classification Search ............ 369/679.01–679.61; 221/264–272; 222/336, 361, 243, 511

See application file for complete search history.

(56) References Cited

U.S. PATENT DOCUMENTS 3,641,909 A * 2/1972 Baker .......................... 396/610
2003/0184529 A1* 10/2003 Chien et al. .................. 345/179

* cited by examiner

*Primary Examiner* — Kent Chang
*Assistant Examiner* — Nathan Brittingham
(74) *Attorney, Agent, or Firm* — Altis Law Group, Inc.

(57) ABSTRACT

A stylus retaining mechanism is configured for retaining a stylus to a housing. The stylus includes a latching portion. The stylus retaining mechanism includes a locking assembly. The housing includes a fixing portion, an opening and a receiving chamber communicating with the opening. The receiving chamber is configured to receive a stylus, the housing including. The locking assembly is attached to the fixing portion. The locking assembly includes a locking member and an elastic member. One end of the elastic member is attached to the fixing portion, and the other end resists the locking member. The locking member includes a protrusion to engage with a latching portion of the stylus.

16 Claims, 5 Drawing Sheets

STYLUS RETAINING MECHANISM FOR PORTABLE ELECTRONIC DEVICE

This application is related to co-pending U.S. patent applications (Ser No. 12/869,886 and Ser. No. 12/869,868), all entitled "STYLUS RETAINING MECHANISM FOR PORTABLE ELECTRONIC DEVICE". Such applications have the same assignee as the present application. The above-identified applications are incorporated herein by reference.

BACKGROUND

1. Technical Field

The disclosure generally relates to a stylus retaining mechanism, and, particularly, to a stylus retaining mechanism used in a portable electronic device.

2. Description of Related Art

Many portable electronic devices, such as palmtop computers, laptop computers, mobile phones and personal digital assistants (PDAs), include a stylus or a touch pen. This can be utilized to input information into the electronic device, to select menu options or otherwise navigate through a touch control graphical user interface of an operating system or the current software. Generally, the stylus is stored inside a housing of the portable electronic device. A stylus retaining mechanism is used to retain the stylus. A conventional stylus retaining mechanism includes a hook to lock the stylus. However, the hook can lock the stylus too tightly and it can be hard to remove for use.

Therefore, there is room for improvement within the art.

BRIEF DESCRIPTION OF THE DRAWINGS

Many aspects of the stylus retaining mechanism can be better understood with reference to the following drawings. The components in the drawings are not necessarily drawn to scale, the emphasis instead being placed upon clearly illustrating the principles of the stylus retaining mechanism.

DETAILED DESCRIPTION

Figure 1:
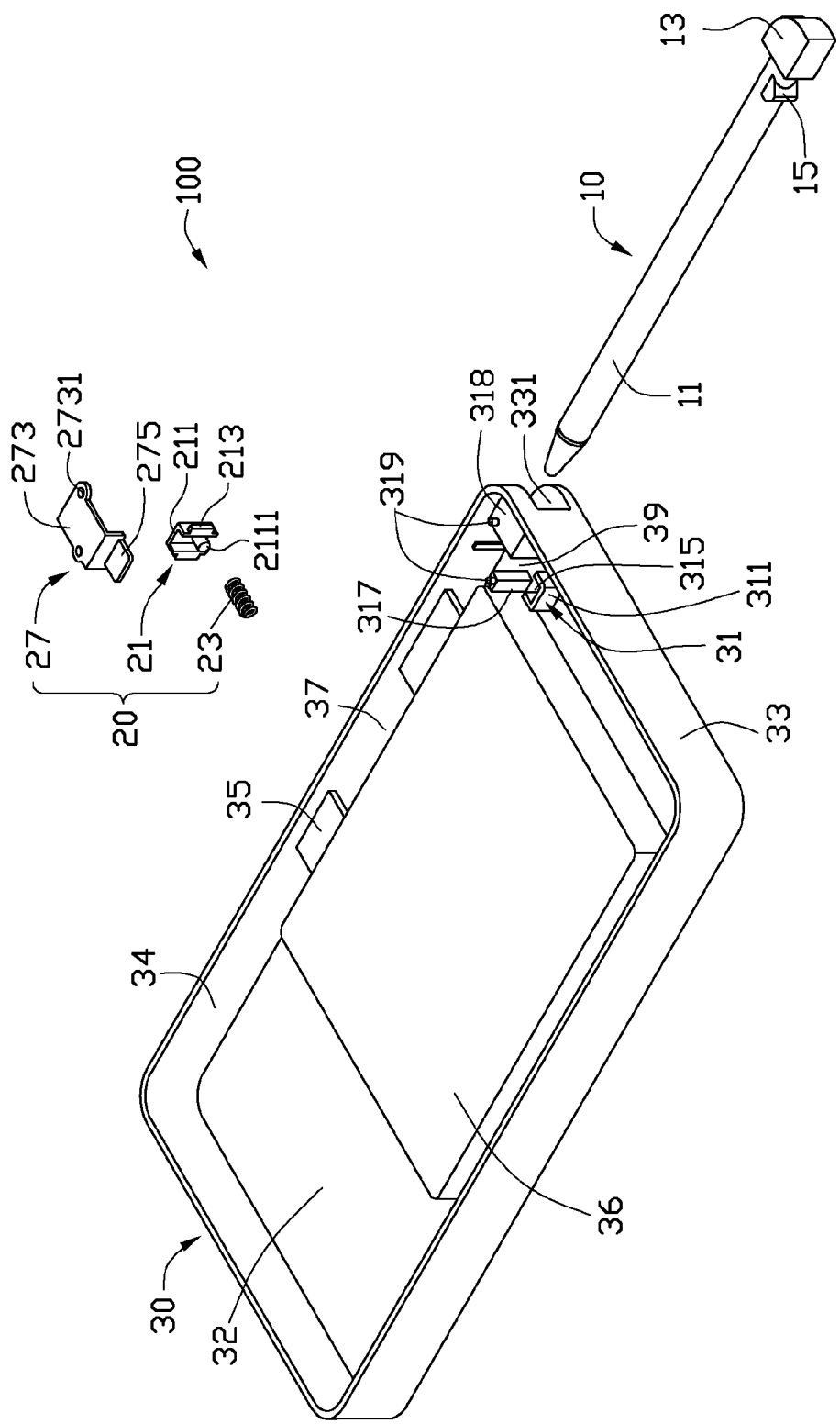
FIG. 1 is an exploded, isometric view of a stylus retaining mechanism with a stylus, in accordance with an exemplary embodiment.

FIG. 1 shows an exemplary embodiment of a stylus retaining mechanism 100 applied to a portable electronic device (not labeled) for retaining a stylus 10.

The stylus 10 includes a main body 11 and a head portion 13 at one end of the main body 11. A latching portion 15 is formed on the main body 11 adjacent to the head portion 13. The latching portion 15 has a triangular cross-section.

The stylus retaining mechanism 100 includes a housing 30 and a locking assembly 20. The housing 30 includes a bottom plate 32, an end wall 33 and a sidewall 34. A block 36 is formed on the bottom plate 32 spaced from the sidewall 34. At least one top plate 35 connects the block 36 to the sidewall 34, and is substantially parallel to the bottom plate 32. The bottom plate 32, the sidewall 34, the block 36, and the top plate 35 cooperatively define a receiving chamber 37 for receiving the stylus 10. The end wall 33 defines an opening 331 communicating with the receiving chamber 37. The opening 331 allows the stylus 10 to be inserted into the receiving chamber 37. A fixing portion 31 is formed on a corner of the block 26 substantially adjacent to the opening 331. The fixing portion 31 includes a frame 311, a first stage 317, and a second stage 318. The frame 311 defines a slot 315. The first stage 317 is positioned adjacent to the block 36. The second stage 318 extends from the end wall 33, and the opening 331 is through the second stage 318. A space 39 is defined between the first stage 317 and the second stage 318, communicating with the receiving chamber 37. A pin 319 is formed on each stage 317 and 318.

Figure 2:
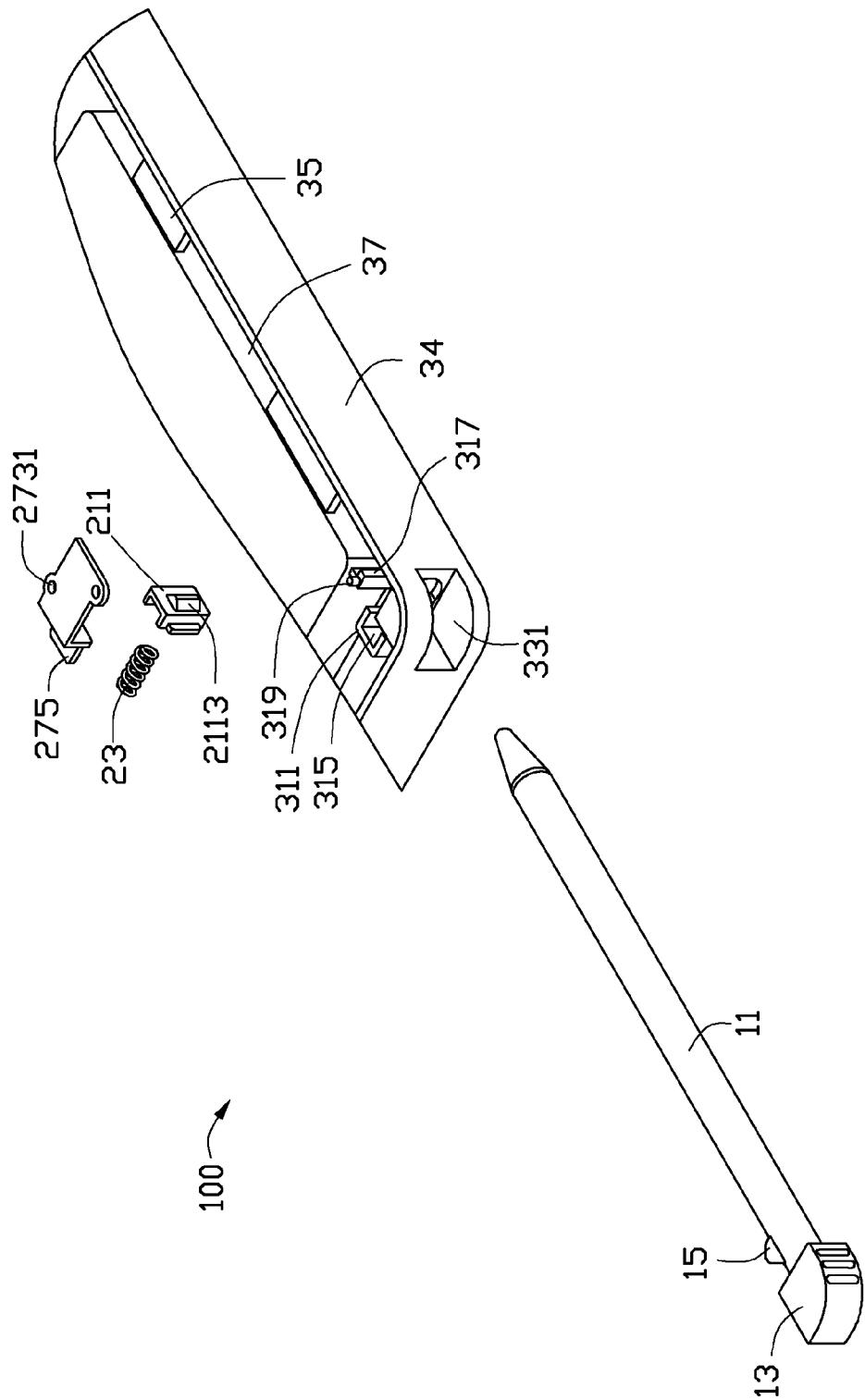
FIG. 2 is similar to FIG. 1, but partially shown from another aspect.

Also referring to FIG. 2, the locking assembly 20 includes a locking member 21, a spring 23, and a fixing member 27. The locking member 21 includes a main portion 211 and two clamping portions 213. The main portion 211 is substantially U-shaped, and each clamping portion 213 extends from one distal end of the main portion 211. A post 2111 is formed at one side of the main portion 211 between the two clamping portions 213, and a protrusion 2113 is formed at another side of the main portion 211. The protrusion 2113 has a triangular cross-section corresponding to the latching portion 15. The fixing member 27 includes a distorted portion 273 and an extending portion 275 extending from one distal end of the distorted portion 273. The distorted portion 273 defines two positioning holes 2731 corresponding to the pins 319.

Figure 3:
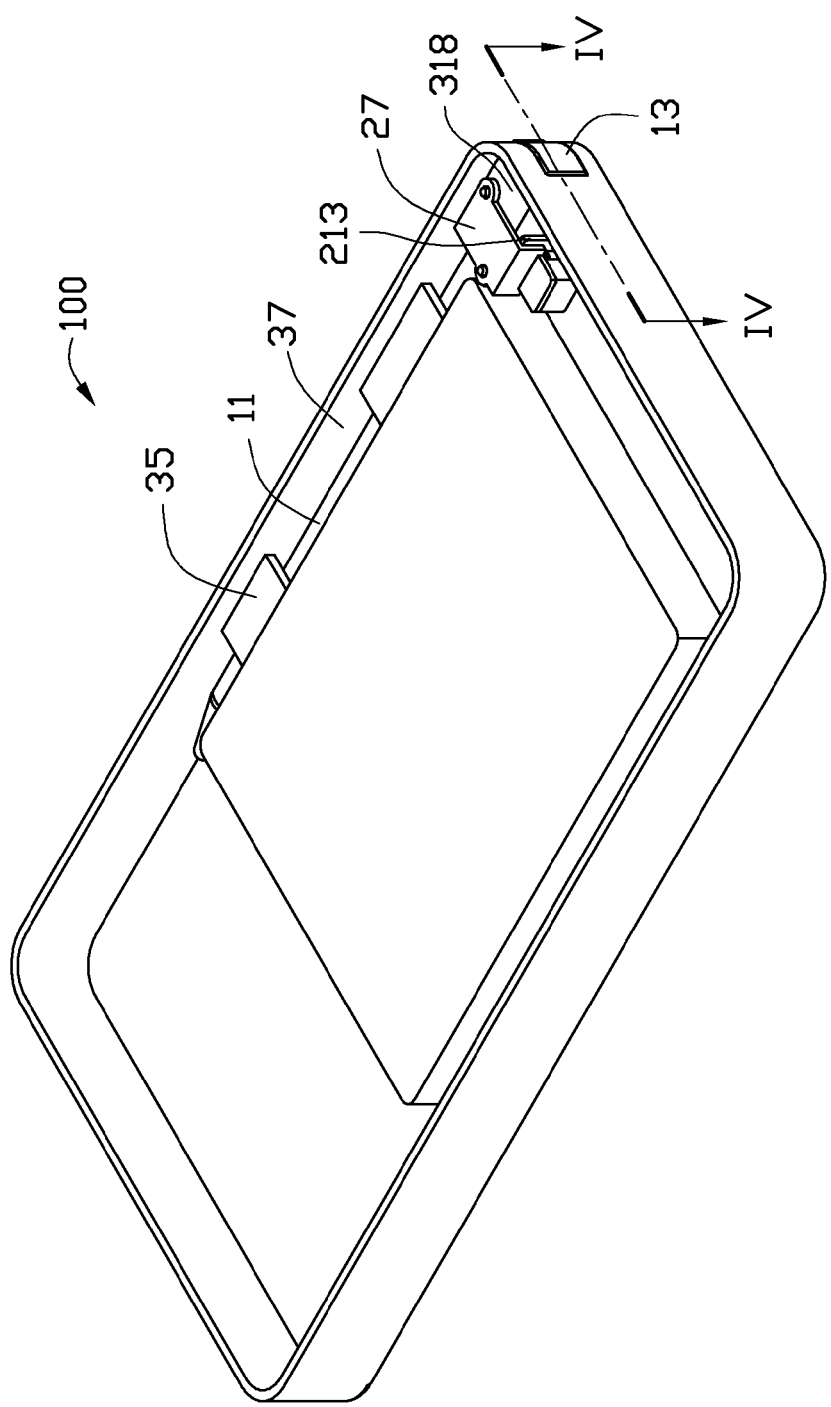
FIG. 3 is an assembled, isometric view of the stylus retaining mechanism shown in FIG. 1.
Figure 4:
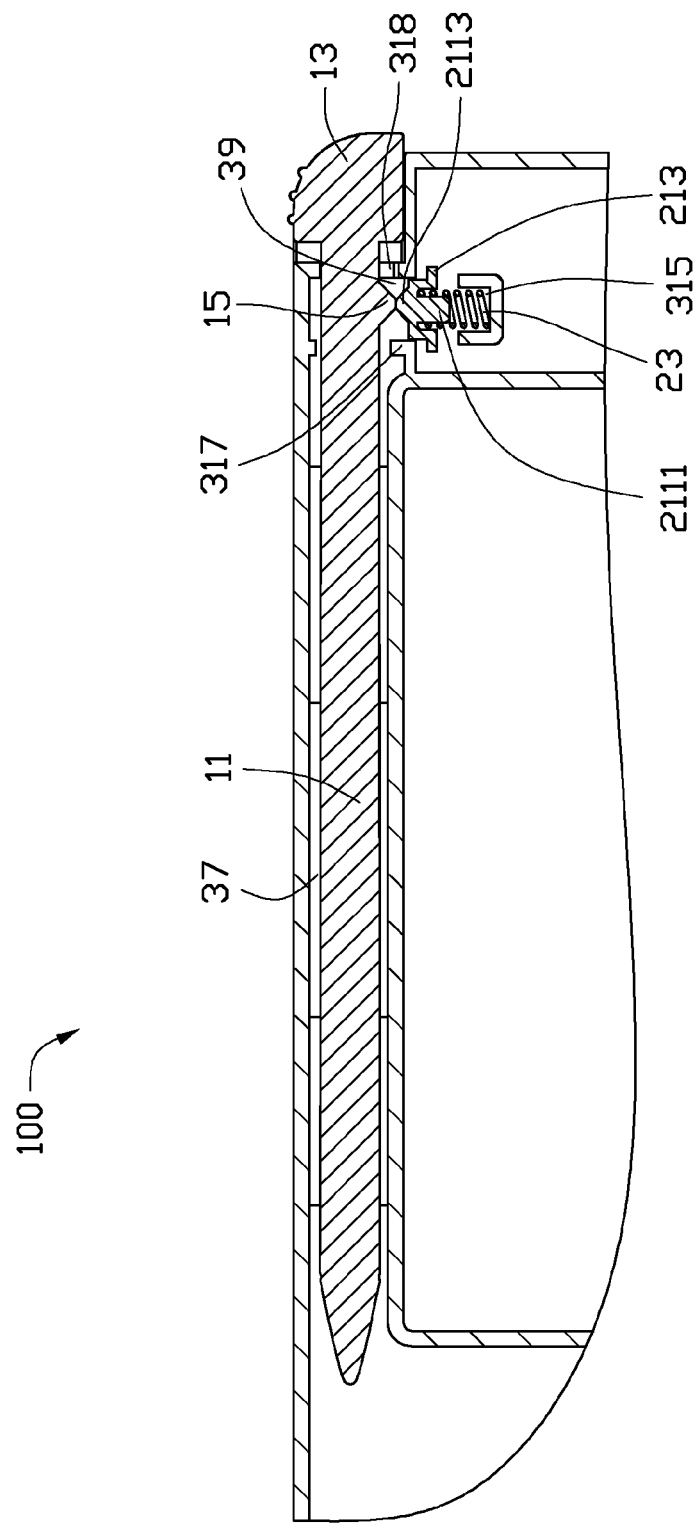
FIG. 4 is a partially cross-sectional view of the stylus retaining mechanism shown in FIG. 1 taken along line IV-IV, showing the stylus being inserted into a receiving chamber of the stylus retaining mechanism.

Also referring to FIGS. 3 and 4, to attach the locking assembly 20 to the housing 30, the locking member 21 is positioned between the first and the second stages 317 and 318, and the protrusion 2113 is received in the space 39 for engaging with the latching portion 15 of the stylus 10. One end of the spring 23 is received in the slot 315, and the other end is placed around the post 2111 of the locking member 21. The fixing member 27 is fixed to the fixing portion 31 with an engagement between the pins 319 and the positioning holes 2731. The distorted portion 273 covers the locking member 21, and the extending portion 275 covers the slot 315. Thus, the distorted portion 273 and the extending portion 275 can respectively prevent the locking member 21 and the spring 23 from separating from the housing 30.

Figure 5:
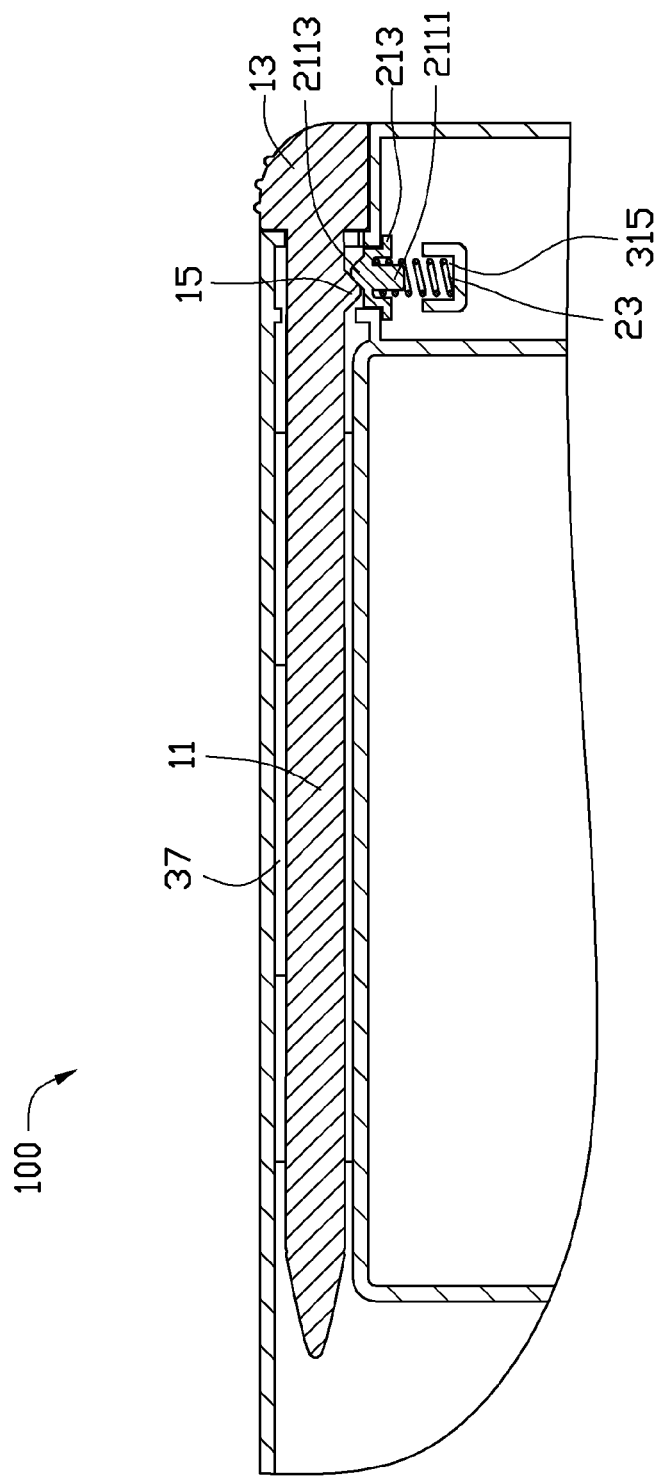
FIG. 5 is similar to FIG. 4, but showing the stylus locked in the receiving chamber.

To attach the stylus 10 to the stylus retaining mechanism 100, the stylus 10 is inserted into the receiving chamber 37 through the opening 331. The latching portion 15 touches the protrusion 2113 and pushes the locking member 21 to move. At the same time, the spring 23 is compressed. Also referring to FIG. 5, when the latching portion 15 of the stylus 10 passes the protrusion 2113, the spring 23 gives a rebounding force to push the locking member 21 to return to an original position. The first and the second stages 317 and 318 stop the clamping portions 213 from moving further, which prevents the locking member 21 from separating from the fixing portion 31. Thus, the stylus 10 is locked in the receiving chamber 37 with an engagement between the latching portion 15 and the protrusion 2113, with the head portion 13 received in the opening 331.

To detach the stylus 10 from the stylus retaining mechanism 100, the head portion 13 is moved out from the opening 331, the latching portion 15 pushes the locking member 21 to move and then passes the locking member 21. Thus, the stylus 10 can be easily moved out from the stylus retaining mechanism 100 with the head portion 13.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stylus retaining mechanism for retaining a stylus, the stylus including a latching portion, the stylus retaining mechanism comprising:

a housing defining an opening and a receiving chamber, the receiving chamber communicating with the opening, the receiving chamber configured for receiving the stylus, the housing forming a fixing portion including a first stage and a second stage spaced from each other, the first stage and the second stage aligned along the receiving chamber; and a locking assembly attached to the housing, the locking assembly including a locking member and an elastic member; the locking member including a U-shaped main portion and two opposite clamping portions, each clamping portion perpendicularly extending from a distal end of the main portion, and a protrusion perpendicularly extending from a middle of the main portion and away from the two clamping portions; one end of the elastic member attached to the housing, and the other end of the elastic member located between the two clamping portions and resisting the main body;

wherein one of the two clamping portions resists the first stage and the other of the two clamping portions resists the second stage; the protrusion is located between the first stage and the second stage and engaged with the latching portion of the stylus.

2. The stylus retaining mechanism as claimed in claim 1, wherein the locking assembly further comprises a fixing member, and the fixing member is fixed to the first and the second stages to prevent the elastic member and the locking member from separating from the housing.

3. The stylus retaining mechanism as claimed in claim 2, wherein the fixing member comprises a distorted portion and an extending portion, the distorted portion is fixed to the first and the second stages and covers the locking member, the fixing portion includes a frame, the frame defines a slot to receive one end of the elastic member, and the extending portion covers the slot.

4. The stylus retaining mechanism as claimed in claim 3, wherein a pin is formed on each of the first and the second stages, and the distorted portion defines two positioning holes to engage with the pins.

5. The stylus retaining mechanism as claimed in claim 1, wherein a post is formed at one side of the main portion, the protrusion is formed at another side of the main portion, the elastic member is a spring, and one end of the elastic member is fixed to the post.

6. The stylus retaining mechanism as claimed in claim 1, wherein the latching portion of the stylus has a triangular cross-section.

7. The stylus retaining mechanism as claimed in claim 6, wherein the protrusion has a triangular cross-section.

8. A portable electronic device comprising:
a stylus including a latching portion;
a housing defining an opening and a receiving chamber, the receiving chamber communicating with the opening, the receiving chamber configured for receiving the stylus, the housing forming a fixing portion including a first stage and a second stage spaced from each other, the first stage and the second stage aligned along the receiving chamber; and
a locking assembly attached to the fixing portion, the locking assembly including a locking member and an elastic member; the locking member including U-shaped main portion and two opposite clamping portions, each clamping portion perpendicularly extending from a distal end of the main portion, and a protrusion perpendicularly extending from a middle of the main portion and away from the two clamping portions; one end of the elastic member attached to the housing, and the other end of the elastic member located between the two clamping portions and resisting the main body; the stylus locked in the receiving chamber with an engagement between the latching portion and the protrusion; the locking member pushed to press the elastic member by the latching portion when the stylus is moved in or out of the receiving chamber, and the compressed elastic member giving a rebounding force to push the locking member to return to original position.

9. The portable electronic device as claimed in claim 8, wherein the locking assembly further comprises a fixing member, and the fixing member is fixed to the first and the second stages to prevent the elastic member and the locking member from separating from the housing.

10. The portable electronic device as claimed in claim 9, wherein the fixing member comprises a distorted portion and an extending portion, the distorted portion is fixed to the first and the second stages and covers the locking member, the fixing portion defines a slot to receive one end of the elastic member, and the extending portion covers the slot.

11. The portable electronic device as claimed in claim 10, wherein a pin is formed on each of the first and the second stages, the distorted portion defines two positioning holes to engage with the pins.

12. The portable electronic device as claimed in claim 8, wherein a post is formed at one side of the main portion, the protrusion is formed at another side of the main portion, the elastic member is a spring, and one end of the elastic member is fixed to the post.

13. The portable electronic device as claimed in claim 8, wherein the latching portion of the stylus has a triangular cross-section.

14. The portable electronic device as claimed in claim 13, wherein the protrusion has a triangular cross-section.

15. The stylus retaining mechanism as claimed in claim 1, wherein the housing comprises a bottom plate and a sidewall, a block is formed on the bottom plate spaced from the sidewall, at least one top plate connects the block to the sidewall; the bottom plate, the sidewall, the block, and the top plate cooperatively define the receiving chamber.

16. The portable electronic device as claimed in claim 8, wherein the housing comprises a bottom plate and a sidewall, a block is formed on the bottom plate spaced from the sidewall, at least one top plate connects the block to the sidewall; the bottom plate, the sidewall, the block, and the top plate cooperatively define the receiving chamber.

* * * * *